(12) United States Patent
Fang et al.

(10) Patent No.: US 10,549,352 B1
(45) Date of Patent: Feb. 4, 2020

(54) INDEXABLE TANGENTIAL CUTTING INSERTS AND CUTTING TOOL HOLDERS

(71) Applicant: Kennametal Inc., Latrobe, PA (US)

(72) Inventors: Xiangdong D. Fang, Greensburg, PA (US); Jean-Luc D. Dufour, Greensburg, PA (US); David J. Wills, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/056,634

(22) Filed: Aug. 7, 2018

(51) Int. Cl.
 *B23C 5/20* (2006.01)
 *B23C 5/02* (2006.01)
 *B23B 27/16* (2006.01)

(52) U.S. Cl.
 CPC .... *B23B 27/1622* (2013.01); *B23B 2200/202* (2013.01); *B23C 2200/367* (2013.01)

(58) Field of Classification Search
 CPC ........ B23C 2200/367; B23C 2200/085; B23C 2200/203; B23B 27/1622; B23B 2200/207; B23B 5/109; B23B 2200/202; B23P 15/34
 See application file for complete search history.

(56) References Cited

U.S. PATENT DOCUMENTS

| 4,182,567 A | 1/1980 | Striegl | |
|---|---|---|---|
| 4,215,955 A | 8/1980 | Lillie | |
| 4,648,760 A * | 3/1987 | Karlsson | B23B 27/141 407/113 |
| 4,655,648 A | 4/1987 | Hellbergh | |
| 4,790,693 A | 12/1988 | Koblesky | |
| 4,936,719 A | 6/1990 | Peters | |
| 5,586,843 A | 12/1996 | Minicozzi | |
| 5,709,509 A * | 1/1998 | Wegener | B23C 5/2213 407/114 |
| 6,238,133 B1 * | 5/2001 | DeRoche | B23C 5/2221 403/359.1 |
| 6,659,694 B1 | 12/2003 | Asbell et al. | |
| 6,773,209 B2 | 8/2004 | Craig | |
| 7,563,059 B2 | 7/2009 | Song | |
| 8,690,494 B2 | 4/2014 | Fang et al. | |
| 9,700,969 B2 * | 7/2017 | Fang | B23C 5/109 |
| 10,016,822 B2 * | 7/2018 | Crespin | B23C 5/06 |
| 2006/0269366 A1 * | 11/2006 | Rieth | B23C 5/2213 407/113 |

(Continued)

FOREIGN PATENT DOCUMENTS

| EP | 1442852 A1 | 8/2004 | |
|---|---|---|---|
| JP | 01020911 A * | 1/1989 | B23C 5/109 |

(Continued)

*Primary Examiner* — Sara Addisu
(74) *Attorney, Agent, or Firm* — Larry R. Meenan

(57) ABSTRACT

Cutting tool systems including a tool holder and tangential cutting inserts are disclosed. The tangential cutting inserts have indexable cutting edges that may be sinusoidal-shaped and helical-shaped. The tangential cutting inserts have integrated fan and base portions. The tool holders comprise a plurality of insert pockets structured and arranged to receive the indexable tangential cutting inserts. The cutting tool systems provide cutting tools with effectively longer sinusoidal and helical cutting edges at their cutting rake faces and a strong support when seating in insert-receiving pockets on the tool holder.

27 Claims, 14 Drawing Sheets

(56) References Cited

U.S. PATENT DOCUMENTS

| | | | |
|---|---|---|---|
| 2007/0217873 A1 | 9/2007 | Martin et al. | |
| 2009/0242278 A1* | 10/2009 | Garcia | B23B 27/145 |
| | | | 175/405.1 |
| 2010/0047026 A1* | 2/2010 | Horiike | B23C 5/109 |
| | | | 407/40 |
| 2010/0183386 A1* | 7/2010 | Heinloth | B23B 5/18 |
| | | | 407/113 |
| 2012/0051851 A1* | 3/2012 | Saito | B23C 5/109 |
| | | | 407/42 |
| 2013/0149053 A1* | 6/2013 | Bhagath | B23C 5/08 |
| | | | 407/51 |
| 2014/0064864 A1* | 3/2014 | Kaufmann | B23B 27/141 |
| | | | 407/114 |

FOREIGN PATENT DOCUMENTS

| | | | | |
|---|---|---|---|---|
| JP | 01103219 A | * | 4/1989 | B23C 5/109 |
| JP | 2017196692 A | * | 11/2017 | B23B 27/1611 |
| SU | 1634372 A1 | | 3/1991 | |
| WO | WO-2014034614 A1 | * | 3/2014 | B23B 27/045 |

* cited by examiner

INDEXABLE TANGENTIAL CUTTING INSERTS AND CUTTING TOOL HOLDERS

FIELD OF THE INVENTION

The present invention relates to cutting tools, including cutting tool holders and cutting inserts. In particular, the present invention relates to indexable and replaceable cutting inserts and tool holders configured to engage and secure the indexable and replaceable cutting inserts.

BACKGROUND INFORMATION

Indexable cutting inserts for cutting tools include, for example, cutting inserts made of carbide, ceramic, coated carbide, coated ceramic, or other hard materials. Such inserts generally have multiple cutting edges located at various corners or around peripheral edges of the inserts. In a conventional arrangement, cutting inserts are mechanically secured to a tool holder, and are removable in relation to the tool holder, and may be readily re-positioned (i.e., indexed) to present a fresh and new cutting edge to engage a workpiece. A tangential cutting insert refers to a cutting insert that lies flat around the cutting diameter of a tool holder with its fastener hole axis pointing to the cutting axis of a cutting tool. A tangential cutting insert presents the strongest cutting section (i.e., largest thickness) against the main cutting force which is the tangential component of the cutting force at the cutting diameter.

In conventional designs for positioning multiple cutting inserts in a tool holder to form a cutting flute comprising a combined sinusoidal and helical cutting edge in a cutting tool system, the shape of the cutting insert is limited to either a generally rectangular shape or a generally square shape. For a generally rectangle or square cutting insert, the cutting edge length and the total cutting insert length is about the same. In order to form a cutting flute comprising a combined sinusoidal and helical cutting edge, there is not enough space to build a strong insert-receiving pocket in the holder to receive the common cutting inserts. The insufficient space can cause weaker and less stable support for a cutting insert with sinusoidal and helical cutting edge while seating in the pocket of a tool holder.

Furthermore, the complex cutting edges of conventional indexable sinusoidal and helical cutting inserts can require pockets having complex surfaces to receive the inserts. The complex edges and surfaces can create weak connections that cause a reduction in performance during cutting operations.

SUMMARY OF THE INVENTION

Cutting inserts are provided that include an integrated fan and base shape providing at least two indexable cutting edges, each with a sinusoidal and helical cutting edge. Cutting tool holders are also provided to engage and secure the indexable cutting inserts. The cutting tool holders may include coolant outlets to provide coolant to the cutting inserts. The cutting inserts and tool holders may be used in rotary machining tool systems.

An aspect of the present invention is to provide a tangential cutting insert comprising a base portion comprising a substantially planar rear face, a first substantially planar side base surface extending forward from the substantially planar rear face, and a second substantially planar side base surface extending forward from the substantially planar rear face, and a cutting portion comprising a first side fan surface extending forward from the first substantially planar side base surface at a first outward taper angle and terminating at a front surface, and a second side fan surface extending forward from the second substantially planar side base surface at a second outward taper angle and terminating at the front surface.

Another aspect of the present invention is to provide a tangential cutting insert comprising a substantially planar rear base surface, a front cutting surface opposing the substantially planar rear base surface, a central axis extending perpendicularly from the substantially planar rear base surface to the front cutting surface, and a first sinusoidal and helical cutting edge at a first edge of the front cutting surface and a second sinusoidal and helical cutting edge at a second edge of the front cutting surface, wherein the first and second sinusoidal and helical cutting edges are 180-degree rotationally symmetric about the center axis of the tangential cutting insert.

A further aspect of the present invention is to provide a cutting tool system comprising a plurality of cutting inserts, each cutting insert comprising a substantially planar rear face having a base width, a first substantially planar side base surface extending forward from the substantially planar rear face, a second substantially planar side base surface extending forward from the substantially planar rear face, and a front cutting surface having a cutting surface width greater than the base width, and a tool holder comprising a plurality of insert pockets positioned in a helical orientation about a longitudinal axis of the tool holder, each insert pocket comprising a rear surface to engage the substantially planar rear face of the cutting insert, a first sidewall portion extending forward from the rear surface to accommodate the first substantially planar side surface of the cutting insert, and a second sidewall portion extending forward from the rear surface to engage the second substantially planar side surface of the cutting insert.

A further aspect of the present invention is to provide a cutting tool holder comprising a plurality of insert pockets positioned in a helical orientation about a longitudinal axis of the tool holder, each insert pocket comprising a substantially planar rear surface, a first substantially planar sidewall portion extending perpendicularly from the substantially planar rear surface, a second substantially planar sidewall portion extending perpendicularly from the substantially planar rear surface, a substantially planar bottom seating surface extending perpendicularly from the first and second substantially planar sidewall portions and the substantially planar rear surface, and a radially recessed front portion.

Another aspect of the present invention is to provide a cutting tool holder comprising a plurality of insert pockets positioned in a helical orientation about a longitudinal axis of the tool holder, each insert pocket comprising a first coolant outlet aperture structured and arranged to provide coolant to a cutting edge of a first cutting insert, and a second coolant outlet aperture structured and arranged to provide coolant to an intersection of the cutting edge of the first cutting insert and a cutting edge of a second cutting insert.

These and other aspects of the present invention will be more apparent from the following description.

DETAILED DESCRIPTION

Figure 1:
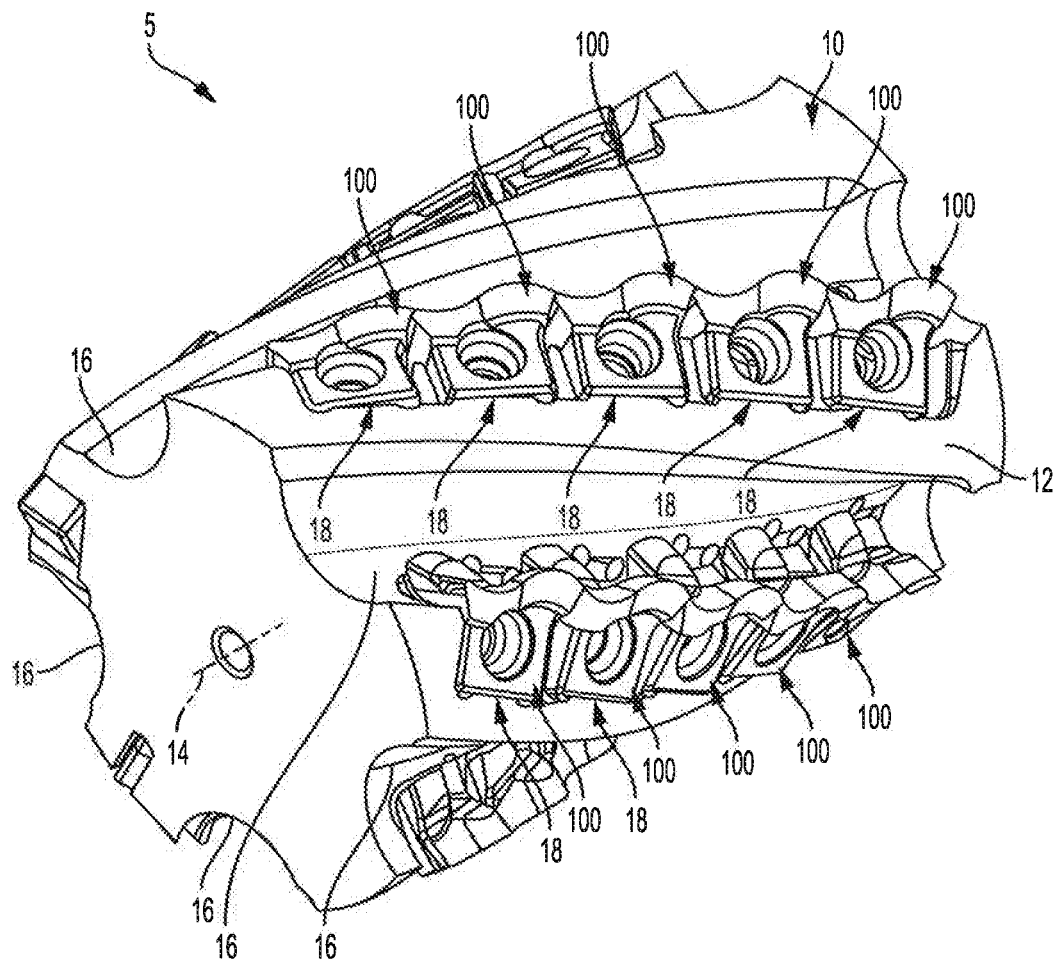
FIG. 1 is an isometric view of a cutting tool system comprising a tool holder and a plurality of tangential cutting inserts in accordance with an embodiment of the present invention.

Tangential cutting inserts having at least two cutting edges and tool holders are provided. The two indexable cutting edges may comprise a combined sinusoidal-shaped and helical-shaped cutting edge. Each tangential cutting insert comprises a cutting portion having a fan-shaped profile and a base portion having a square profile. The fan-shaped profile of the cutting portion provides a longer sinusoidal and helical cutting edge while the square profile of the base portion allows the tangential cutting insert to be more stably supported in the tool holder. Furthermore, the fan-shaped profile of the cutting portion and square profile of the base portion of the tangential cutting insert creates sufficient space to provide pockets in the tool holder between the tangential cutting inserts while still forming a continuous sinusoidal and helical cutting edge along the longitudinal cutting axis of the tool holder.

As used herein, the terms "helix" and "helical" refer to cylindrical helixes, i.e., helixes having a constant radius about a central longitudinal axis. A true helical cutting edge may be defined as a three-dimensional curved cutting edge in which each point on the cutting edge is located at the same perpendicular distance to the central longitudinal cutting axis of the rotary cutting tool. A helical cutting edge may be conceptually developed by moving a point at a constant rate in the longitudinal direction of the cutting axis and at a constant circumferential rate, while maintaining a constant distance (equal to the cutting radius) from the central longitudinal axis (i.e., the cutting axis) of a cutting tool holder.

Further, combining a sinusoidal curve component with a helical curve component in a single cutting edge configuration will still need each point of the resulting combined cutting edge to be located at the same perpendicular distance to the central longitudinal cutting axis of the rotary cutting tool.

Therefore, as used herein, the term "sinusoidal and helical cutting edge(s)" refers to the cutting edge portions of a cutting insert that engage a workpiece and cut material from the workpiece, in which the cutting edges have a geometric shape comprising a sinusoidal curve component and a helical curve component. The term "sinusoidal and helical cutting edge(s)" as used herein also refers to the portions of a flute comprising an assembly of cutting inserts, in which the plurality of cutting inserts form a geometric shape comprising a sinusoidal curve component and a helical curve component. The sinusoidal and helical cutting edge can be similar to the sinusoidal and helical cutting edge disclosed in U.S. Pat. No. 8,690,494 issued Apr. 8, 2014, which is incorporated herein by reference.

The term "square profile", when referring to a base portion of a cutting tool, means that the base portion includes opposing generally or substantially planar top and bottom surfaces, and opposing generally or substantially planar side surfaces. The generally or substantially planar top and bottom surfaces may be perpendicular to the generally or substantially planar side surfaces. The base portion may also include a generally or substantially planar rear face in a plane perpendicular to the planes of the top and bottom surfaces and side surfaces.

FIG. 1 illustrates a cutting tool system 5 in accordance with an embodiment of the present invention. The cutting tool system 5 includes a tool holder 10 and a plurality of tangential cutting inserts 100 installed within the tool holder 10. The tool holder 10 has a generally cylindrical body 12 with a rotational axis 14. In accordance with an embodiment of the present invention, the body 12 of the tool holder 10 includes a plurality of flutes 16 each having a plurality of insert pockets 18 therein. Each insert pocket 18 is structured and arranged to receive a tangential cutting insert 100 to form a substantially continuous sinusoidal and helical cutting edge on the tool holder 10, as more fully described below. In the embodiment shown, the body 12 of tool holder 10 includes five flutes 16, but any other suitable number of flutes may be used. For example, there may be one, two, three, four, six, seven, eight or more flutes.

Figure 2:
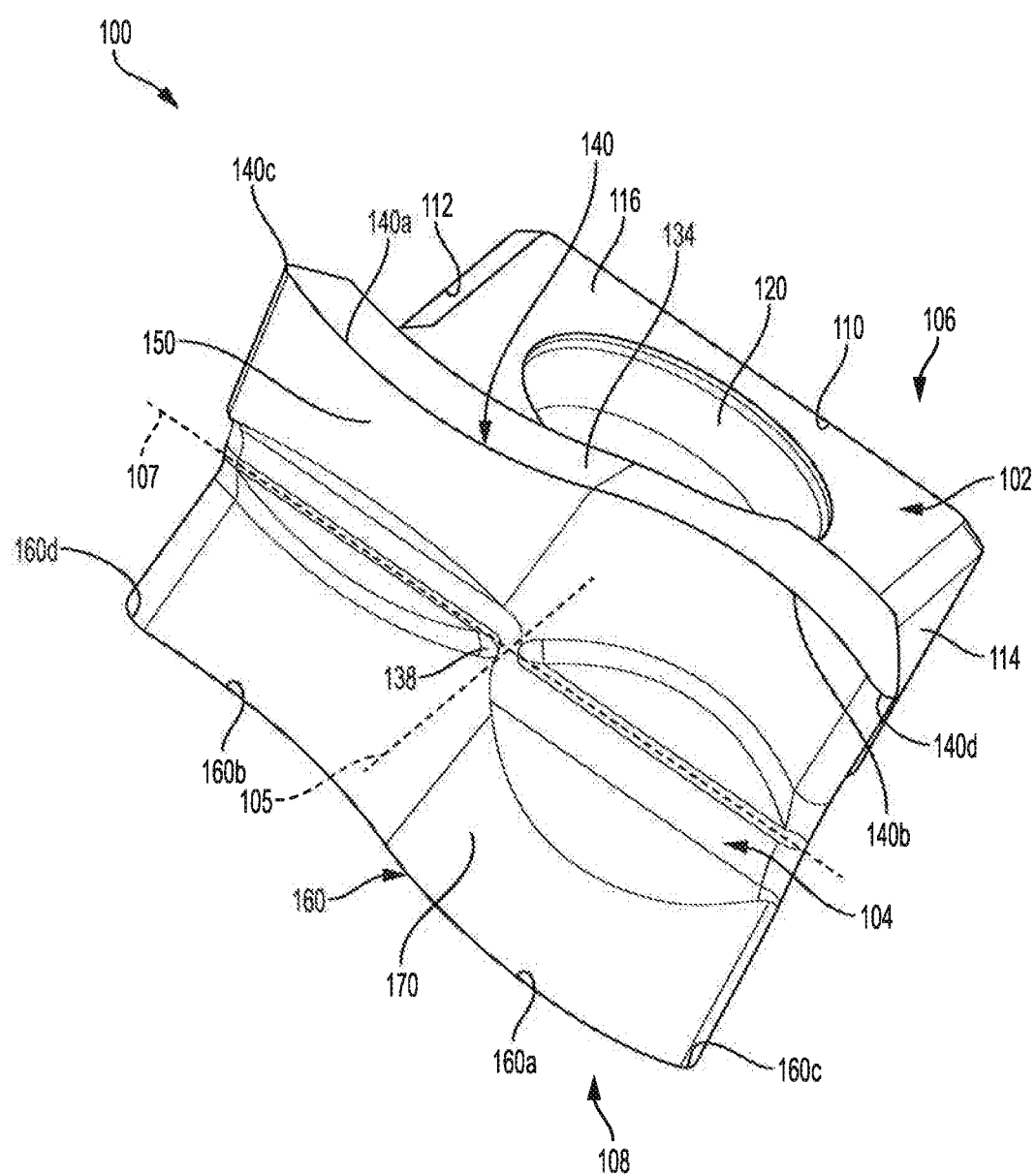
FIG. 2 is an isometric view of a tangential cutting insert in accordance with an embodiment of the present invention.

As shown in FIG. 2, the tangential cutting insert 100 comprises a base portion 102 and a cutting portion 104 generally defining a top side 106 of the insert 100 and a bottom side 108 of the insert 100. As shown in FIGS. 1, 2 and 4-7, the base portion 102 has a square profile as defined above. However, any other suitable shape of base portion may be used, e.g., the base may have a convex or concave curved or angled surface. The base portion 102 has a substantially planar rear face 110, first substantially planar side base surface 112 extending forward from the substantially planar rear face 110, a second substantially planar side base surface 114 extending forward from the substantially planar rear face 110, a substantially planar top base surface 116 perpendicular to the first and second substantially planar side base surfaces 112 and 114 and the substantially planar rear face 110, and a substantially planar bottom base surface 118 perpendicular to the first and second substantially planar side base surfaces 112 and 114 and the substantially planar rear face 110. In the embodiment shown, the first and second substantially planar side base surfaces 112 and 114 are perpendicular to the substantially planar rear face 110. As shown in FIGS. 1, 2 and 4-7, the base portion 102 comprises a mounting through hole 120 extending from the substantially planar top base surface 116 to the substantially planar bottom base surface 118. The central axis 121 of the mounting through hole 120 is perpendicular to the substantially planar top base surface 116 and the substantially planar bottom base surface 118.

Figure 5:
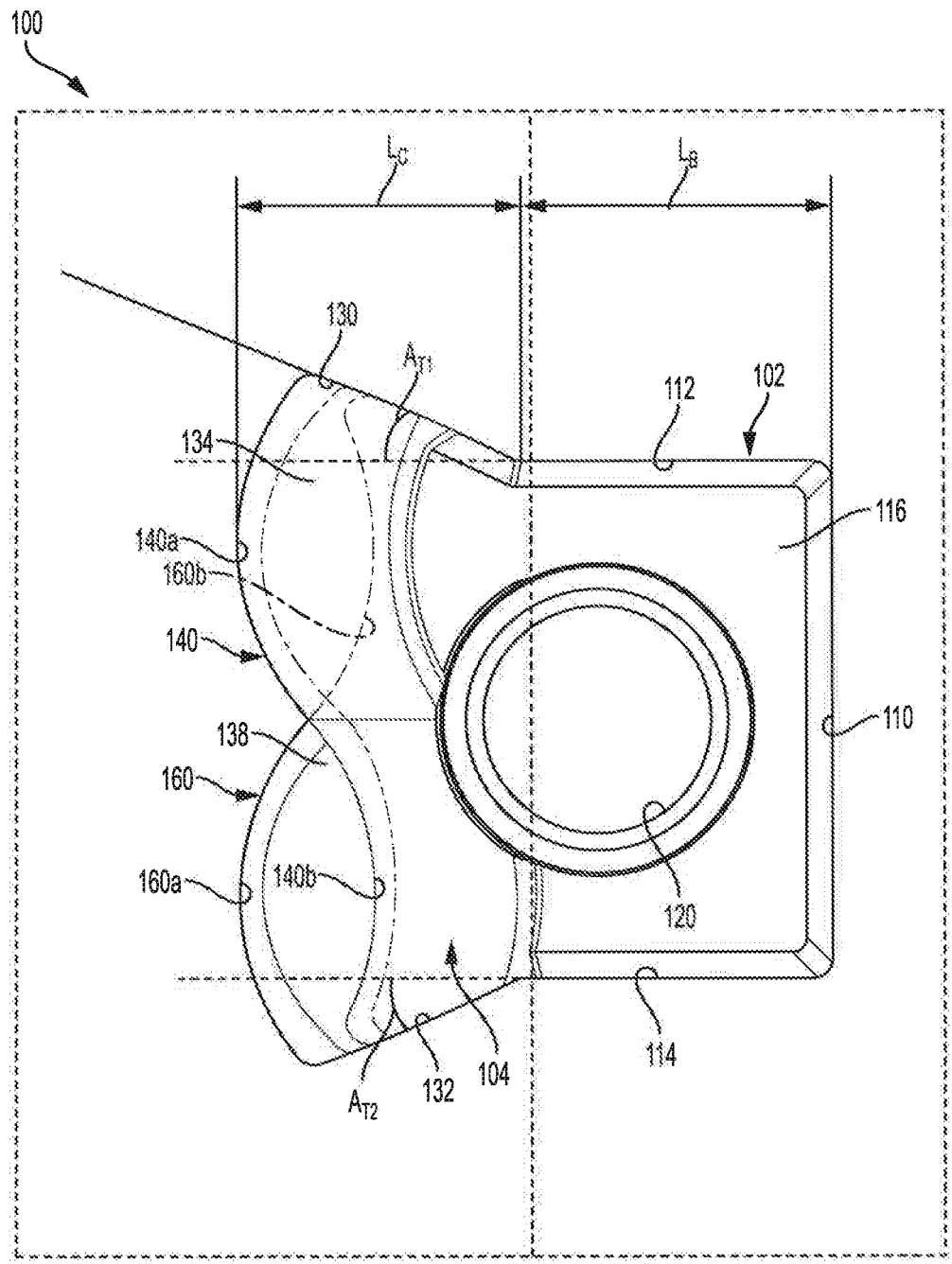
FIG. 5 is a top view of the tangential cutting insert of FIG. 2.

As shown in FIGS. 1, 2, 5-7, the cutting portion 104 extends forward from the base portion 102. The cutting portion 104 is generally fan-shaped, however any other suitable shape of cutting portion may be used, e.g., trapezoidal, triangular, rectangular, hexagonal, ovular or the like. As shown in FIG. 5, the fan-shape of the cutting portion 104 is formed by a first side fan surface 130 extending forward from the first substantially planar side base surface 112, a second side fan surface 132 extending forward from the second substantially planar side base surface 114, a top cutting clearance surface 134, a bottom cutting clearance surface 136, and a front cutting surface 138. In the embodiment shown, the first and second side fan surfaces 130 and 132 are formed as straight lines, however any other suitable shape may be used, e.g., curved lines, or a combination of straight and curved lines. As shown in FIG. 2, the cutting insert 100 has a central axis 105 extending from the rear face 110 to the front cutting surface 138.

In accordance with embodiments of the present invention, the features of the top side 106 and the bottom side 108 of the cutting insert are 180-degree rotationally symmetric about the central axis 105. In certain embodiments, the top cutting clearance surface 134 may extend forward and upward from the substantially planar top base surface 116 of the base portion 102, and the bottom clearance surface 136 may extend forward and downward from the substantially planar bottom base surface 118 of the base portion 102. In the embodiment shown, the top and bottom cutting clearance surfaces 134 and 136 are curved along the width of the cutting portion 104. However, any other suitable shape and arrangement of top and bottom clearance surfaces may be used, e.g., rectangular, straight, ovular, parabolic or the like.

As shown in FIG. 2, the top side 106 of the cutting insert 100 includes a first sinusoidal and helical cutting edge 140 located at an edge between the top cutting clearance surface 134 and the front cutting surface 138. The bottom side 108 of the cutting insert 100 includes a second sinusoidal and helical cutting edge 160 located at an edge between the bottom cutting clearance surface 136 and the front cutting surface 138.

As shown in FIGS. 1-5, each of the first and second cutting edges 140 and 160 comprises a one-wavelength sinusoidal shape as illustrated by a portion of wave form 140a and a portion of wave form 140b for the first cutting edge 140, and similarly a portion of wave form 160a and a portion of wave form 160b for the cutting edge 160. However, any other suitable wavelength of cutting edge may be used, e.g., half-wavelength, one and a half-wavelengths, two-wavelengths or more. In accordance with an embodiment of the present invention, the amplitude of the first and second sinusoidal and helical cutting edges 140 and 160 may be varied depending on the desired shape of the cutting edge. In the embodiment shown, the first and second sinusoidal and helical cutting edges 140 and 160 are indexable and have the same wavelength and amplitude, but the wavelength and amplitude of the first and second cutting edges may be different.

In certain embodiments, the first sinusoidal and helical cutting edge 140 comprises a wave edge 140a, a wave edge 140b, a rounded corner 140c at the end of wave edge 140a, and a rounded corner 140d at the end of wave edge 140b. In certain embodiments, the second sinusoidal and helical cutting edge 160 comprises a wave edge 160a, a wave edge 160b, a rounded corner 160c at the end of wave edge 140a, and a rounded corner 160d at the end of wave edge 160b. In the embodiment shown, the first and second sinusoidal and helical cutting edges 140 and 160 have rounded corners, however any other suitable shape and arrangement of end may be used, e.g., straight, tapered, chamfered or the like.

Figure 3:
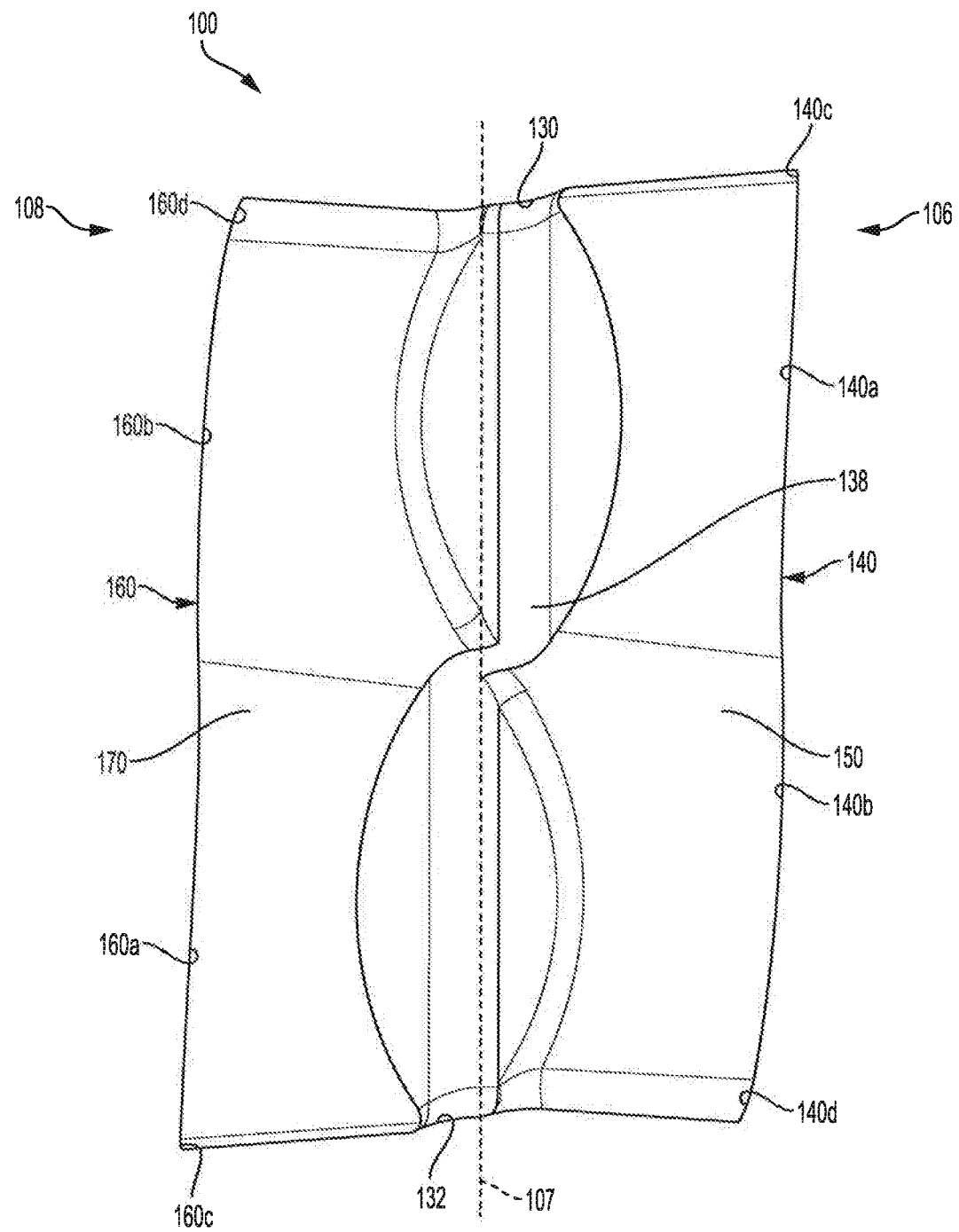
FIG. 3 is a front view of the tangential cutting insert of FIG. 2.

As shown in FIGS. 2 and 3, the front cutting surface 138 of the cutting portion 104 includes a first cutting rake face 150 below the first sinusoidal and helical cutting edge 140 of the top side 106 of the cutting insert 100, and a second cutting rake face 170 above the second sinusoidal and helical cutting edge 160 of the bottom side 108 of the cutting insert 100. In the embodiment shown, the first and second cutting rake faces 150 and 170 of the first and second cutting edges 140 and 160 are 180-degree rotationally symmetric about the central axis 105. As shown in FIGS. 2 and 3, a vertical plane 107 bisects the top side 106 and the bottom side 108 of the cutting insert 100.

In certain embodiments, the first and second cutting edges 140 and 160 and the first and second cutting rake faces 150 and 170 being located on the front cutting surface 138 and being 180-degree rotationally symmetric about the central axis 105 allows for the cutting insert 100 to be indexable in the same square pocket 18.

As shown in FIG. 5, the first side fan surface 130 extends forward from the first substantially planar side base surface 112 at a first outward taper angle $A_{T1}$ that allows the cutting portion 104 to extend beyond the base portion 102. For example, the first outward taper angle $A_{T1}$ may be at least 1 degree, for example, from 2.5 to 50 degrees, or from 5 to 35 degrees, or from 10 to 25 degrees. In a particular embodiment, the first outward taper angle $A_{T1}$ may be about 20 degrees. The second side fan surface 132 extends forward from the second substantially planar side base surface 114 at a second outward taper angle $A_{T2}$ that allows the cutting portion 104 to extend beyond the base portion 102. For example, the second outward taper angle $A_{T2}$ may be at least 1 degree, for example, from 2.5 to 50 degrees, or from 5 to 35 degrees, or from 15 to 25 degrees. In a particular embodiment, the second outward taper angle $A_{T2}$ may be about 20 degrees. In accordance with an embodiment of the present invention, the first outward taper angle $A_{T1}$ may be equal to the second outward taper angle $A_{T2}$. Alternatively, the first and second outward taper angles may be different.

As shown in FIG. 5, the front cutting surface 138 of the cutting portion 104 extends from the first side fan surface 130 to the second side fan surface 132. This arrangement provides the cutting insert with effectively longer first and second cutting edges than the cutting edges of similarly sized square inserts. In the embodiment shown, the front cutting surface 138 comprises the first and second sinusoidal and helical cutting edges 140 and 160. In accordance with embodiments of the present invention, any other suitable arrangement of cutting edge may be used. For example, the first and second cutting edges may be straight, curved, sinusoidal, or the like.

As shown in FIG. 5, the base portion 102 of the cutting insert 100 has a length $L_B$, and the cutting portion 104 of the cutting insert 100 has a length $L_C$. In accordance with an embodiment of the present invention, the base portion length $L_B$ may be equal to or greater than the cutting portion length $L_C$, e.g., at least 5 or 10 percent longer. In certain embodiments, the base portion length $L_B$ is at least 50 percent of a total length of the cutting insert 100. The base portion length $L_B$ is selected to allow the cutting insert 100 to be rigidly secured within a pocket 18 of the tool holder 10. Alternatively, the base portion length $L_B$ may be less than or equal to the cutting portion length $L_C$.

Figure 6:
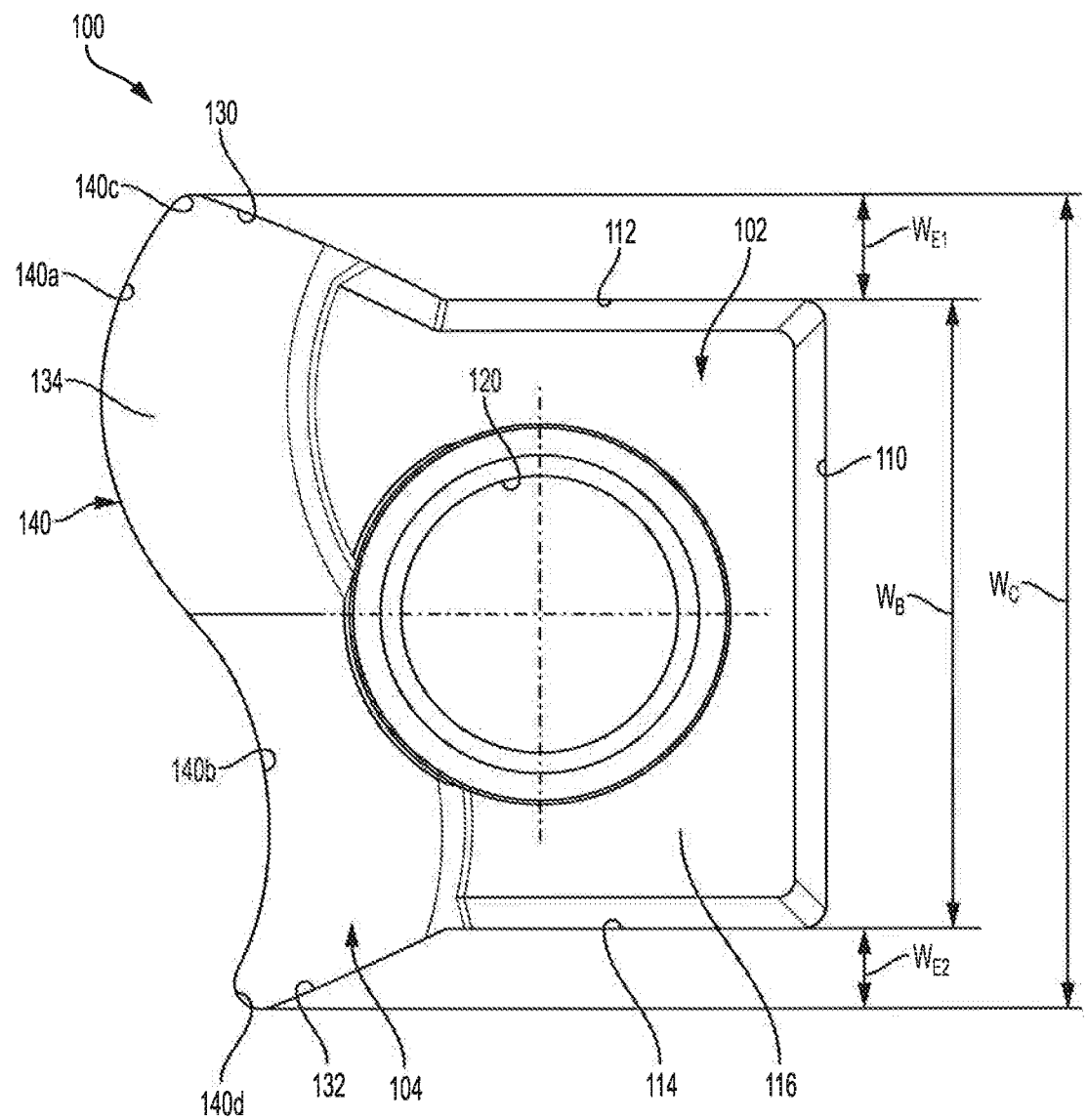
FIG. 6 is a partially schematic top view of one half of the tangential cutting insert of FIG. 2.

As shown in FIG. 6, the base portion 102 of the cutting insert 100 has a width $W_B$ and the cutting portion 104 of the cutting insert 100 has a width We selected to form first and second extension distances $W_{E1}$ and $W_{E2}$. In accordance with an embodiment of the present invention, the cutting portion width We is greater than the base portion width $W_B$ to form the extension distances $W_{E1}$ and $W_{E2}$. In the embodiment shown, the first extension distance $W_{E1}$ is measured from the first substantially planar side base surface 112 to the rounded corner 140c at a first end of the first sinusoidal and helical cutting edge 140 and the second extension distance $W_{E2}$ is measured from the second substantially planar side base surfaces 114 to the rounded corner 140d at a second end of the first sinusoidal and helical cutting edge 140. The extension distances $W_{E1}$ and $W_{E2}$ are desirable to provide a cutting portion 104 having first and second sinusoidal and helical cutting edges 140 and 160 that are wider than the base portion 102.

Figure 4:
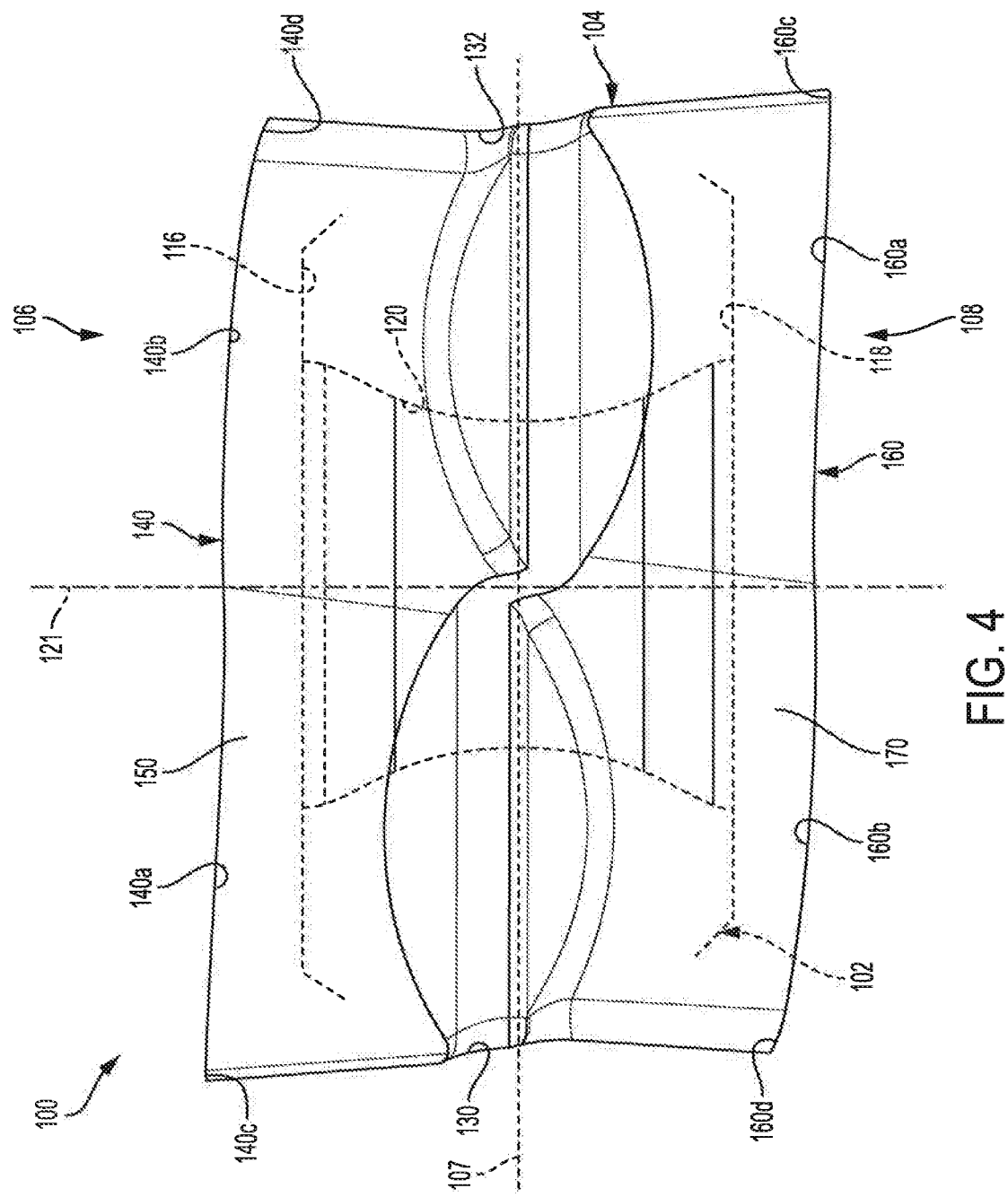
FIG. 4 is a front view of the tangential cutting insert of FIG. 2.
Figure 7:
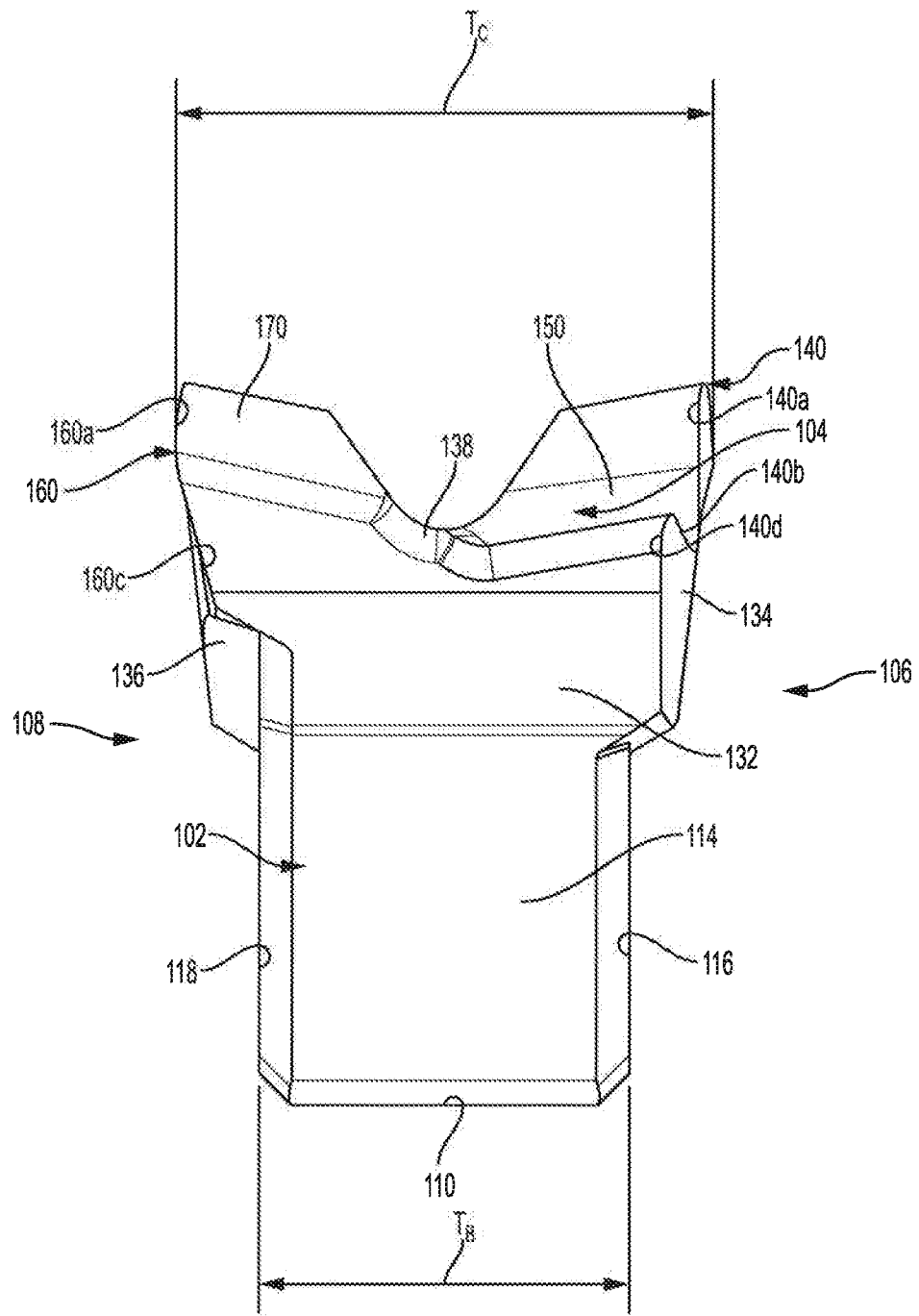
FIG. 7 is a side view of the tangential cutting insert of FIG. 2.

As shown in FIGS. 4 and 7, the cutting portion 104 may extend a distance beyond the base portion 102 of the cutting insert 100 in each direction selected to allow the cutting portion 104 of the cutting insert contact the workpiece. For example, the top cutting clearance surface 134 and the first sinusoidal and helical cutting edge 140 extend upward from the substantially planar top base surface 116 of the base portion 102, and the bottom cutting clearance surface 136 and the second sinusoidal and helical cutting edge 160 extend downward from the substantially planar bottom base surface 118 of the base portion 102. In accordance with an embodiment of the present invention, the first sinusoidal and helical cutting edge 140 of the top side 106 is offset a greater distance from the vertical plane 107 of the cutting insert 100 than the substantially planar top base surface 116 of the base portion 102, and the second sinusoidal and helical cutting edge 160 of the bottom side 108 is offset a greater distance from the vertical plane 107 of the cutting insert 100 than the substantially planar bottom base surface 118 of the base portion 102. As shown in FIGS. 4 and 7, the rounded corners 140c and 140d of the first sinusoidal and helical cutting edge 140 are offset a greater distance from the central axis 121 of the through hole 120 than the first and second substantially planar side base surfaces 112 and 114 of the base portion 102, and the rounded corners 160c and 160d of the second sinusoidal and helical cutting edge 160 are offset a greater distance from the central axis 121 of the through hole 120 than the first and second substantially planar side base surfaces 112 and 114 of the base portion 102.

As shown in FIG. 7, the base portion 102 of the cutting insert 100 has a thickness $T_B$, and the cutting portion 104 of the cutting insert 100 has a thickness $T_C$. In accordance with an embodiment of the present invention, the cutting portion thickness $T_C$ may be greater than or equal to the base portion thickness $T_B$, e.g., at least 5 or 10 percent thicker. In certain embodiments, the cutting portion thickness $T_C$ is at least 20 percent thicker than base portion thickness $T_B$. As previously discussed herein, the cutting portion thickness $T_C$ is selected to allow the cutting portion 104 of the cutting insert 100 to contact the workpiece when the base portion 102 is secured within a pocket 18 of the tool holder 10. Alternatively, the base portion thickness $T_B$ may be greater than or equal to the cutting portion thickness $T_C$.

In accordance with an embodiment of the present invention, the corners formed between the substantially planar top and bottom base surfaces 116 and 118 of the base portion and the substantially planar rear face 110, the first substantially planar side base surface 112 and the second substantially planar side base surface 114 of the base portion 102 may be provided with a chamfer to allow for easier mounting in a pocket 18 of the tool holder 10. However, any other suitable type of bevel may be used, e.g., a radius or the like.

Figure 8:
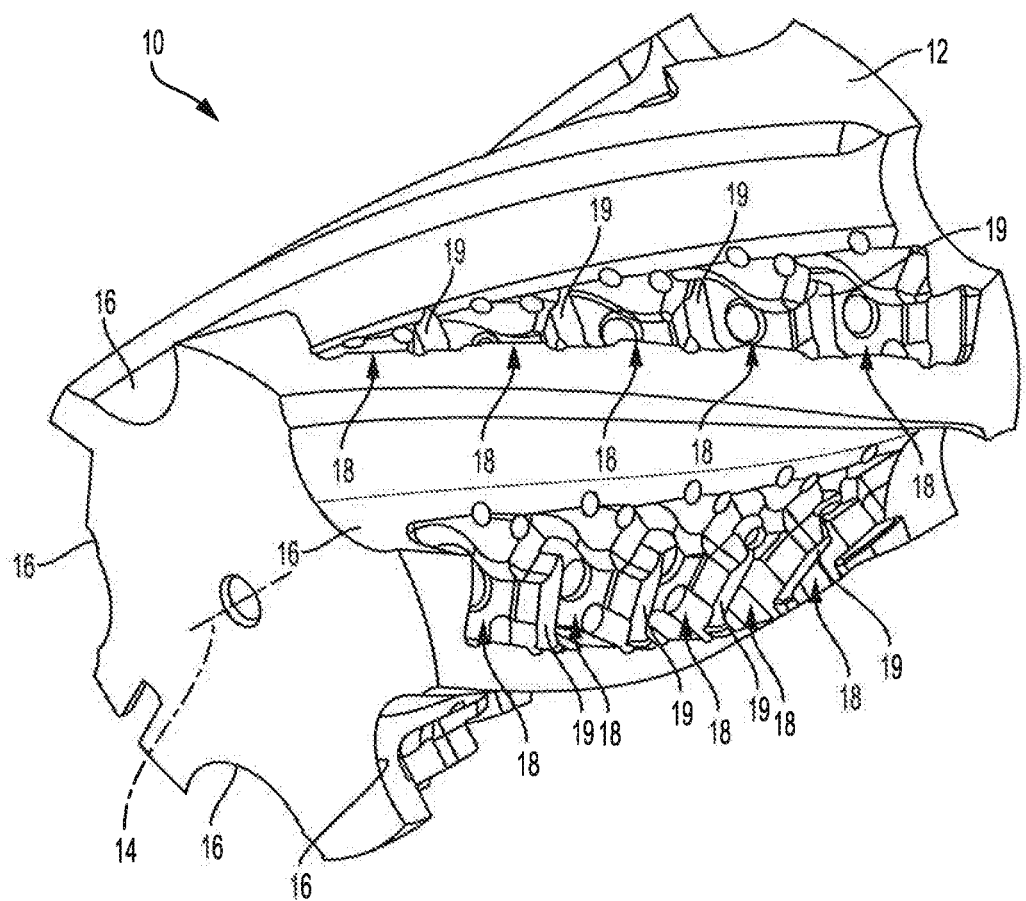
FIG. 8 is an isometric view of a tool holder in accordance with an embodiment of the present invention.
Figure 9:
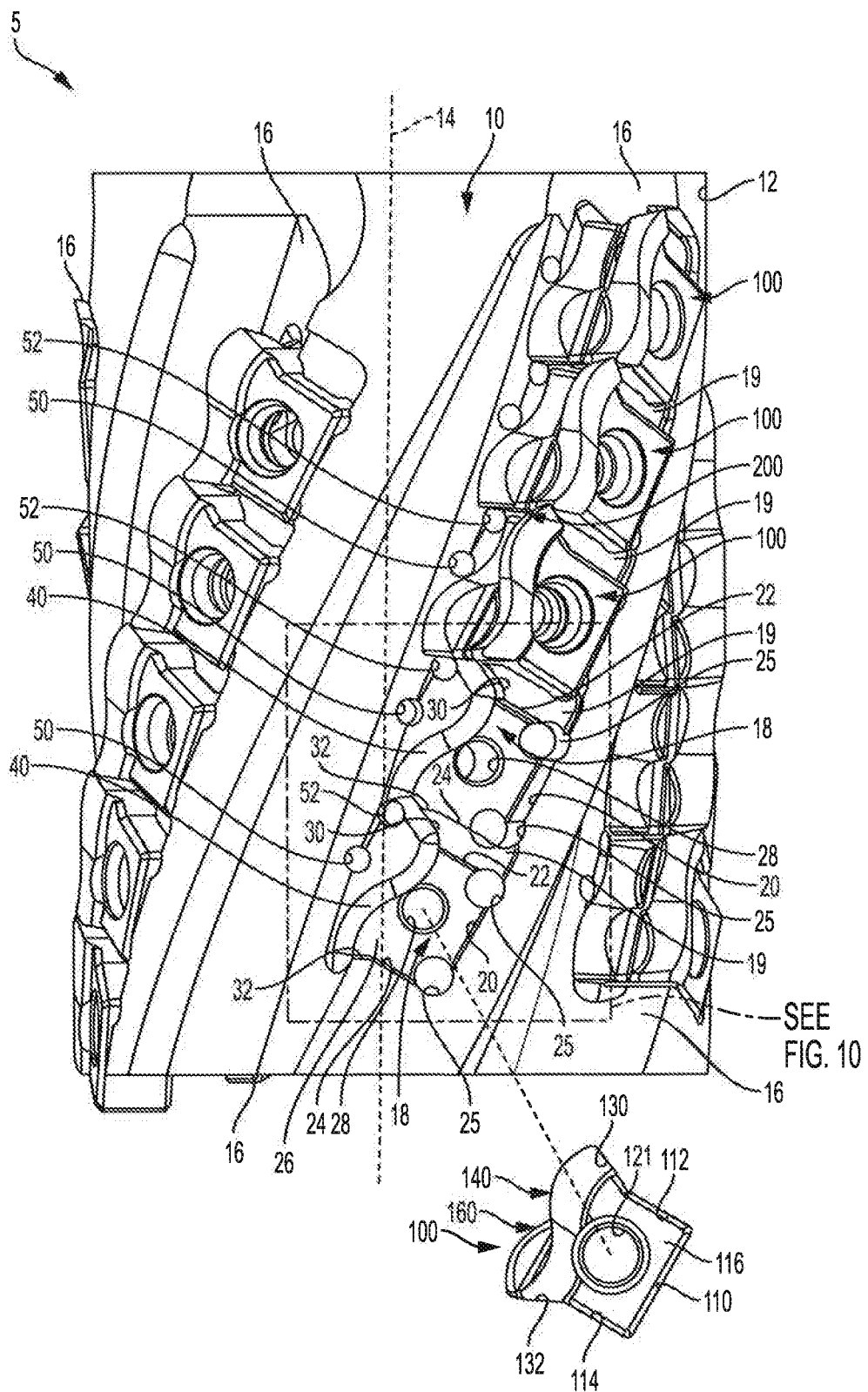
FIG. 9 is a front view of a cutting tool system comprising a tool holder and a plurality of tangential cutting inserts in accordance with an embodiment of the present invention.

As shown in FIG. 8, tool holder 10 comprises a plurality of insert pockets 18 positioned in a helical orientation about a longitudinal axis 14. In certain embodiments, each insert pocket 18, except the first and last pocket 18 of each flute 16, is separated by an insert spacing divider 19. As shown in FIG. 9, the cutting tool system 5 comprises cutting inserts 100 removably secured in each insert pocket 18.

Figure 10:
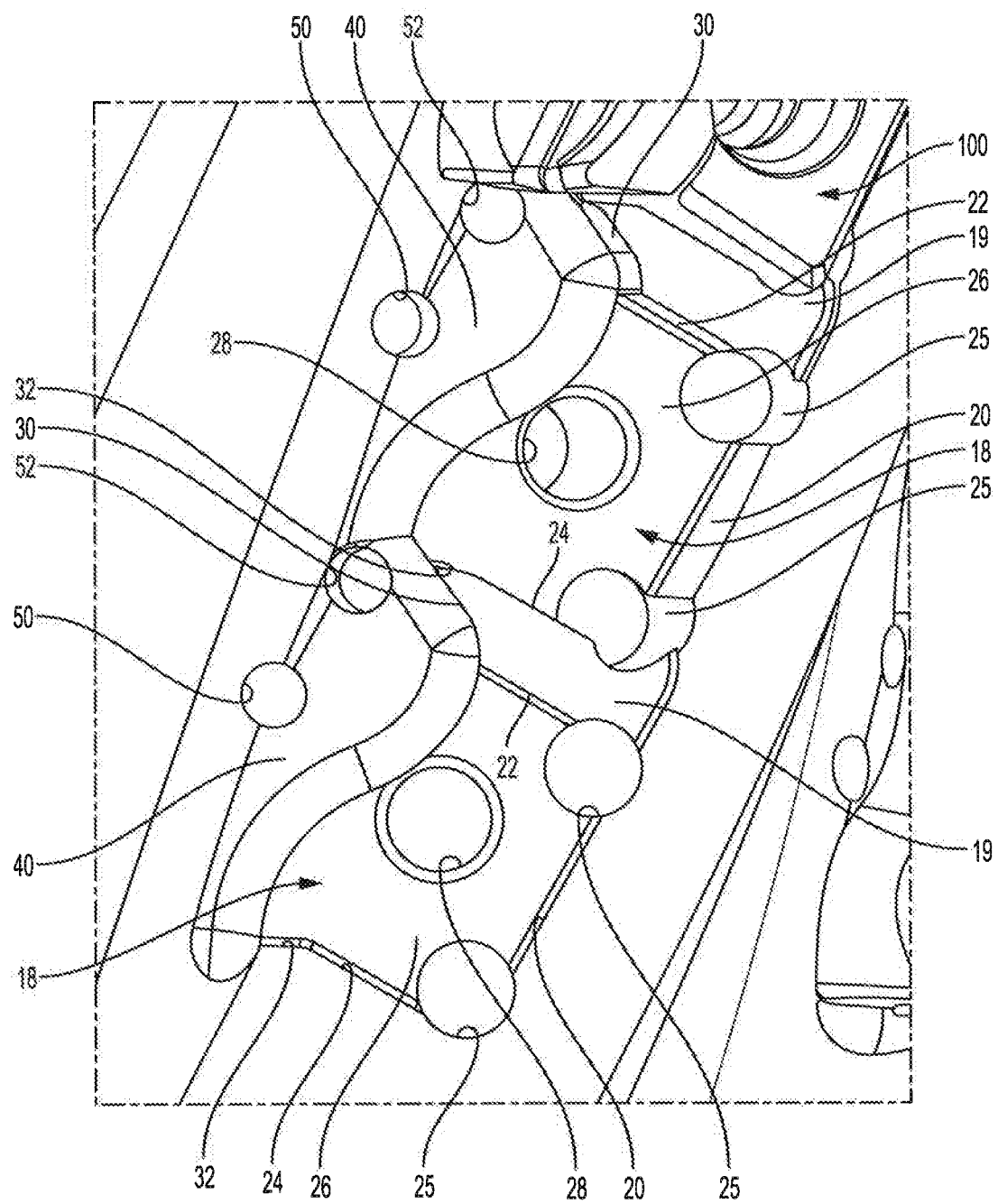
FIG. 10 is a magnified portion of the cutting tool system as shown in FIG. 9.

As shown in FIGS. 8-10, each insert pocket comprises a rear surface 20, a first sidewall portion 22 extending perpendicularly forward from the rear surface 20 and a second sidewall portion 24 extending perpendicularly forward from the rear surface 20. While a generally square insert pockets 18 are shown in this embodiment, any other suitable shape of insert pockets may be used, e.g., rectangular, triangular or the like. As shown in FIGS. 9 and 10, the rear surface 20 may be configured to engage with the substantially planar base surface of cutting insert 100, the first sidewall portion 22 may be configured to accommodate the first substantially planar side base surface 114, and the second sidewall portion 24 may be configured to engage the second substantially planar side base surface 114. For example, the first sidewall portion 22 of the pocket 18 may be parallel to, but not contact, the first substantially planar side base surface 112 of the cutting insert 100. As used herein, the terms "engage", "engages", and "engagement" and "engaging" mean that two or more features interact with each other to restrict relative movement between the cutting insert 100 and the insert pocket 18. In certain embodiments, each insert pocket may comprise a bottom seating surface 26 perpendicular to the rear surface 20 and the first and second sidewall portions 22 and 24. The bottom seating surface 26 may be configured to engage the substantially planar top or bottom base surface 116 or 118 of the cutting insert 100. As shown in FIGS. 9 and 10, the bottom seating surface 26 includes a threaded mounting hole 28 that may be configured to receive a mechanical fastener (not shown) to secure the cutting insert 100 in the insert pocket.

As shown in FIGS. 8-11, each insert pocket 18 may include recessed channels 25 in the corners between the rear surface 20 and the first and second sidewall portions 22 and 24. The recessed channels 25 provide an interference clearance for the insert pockets 18 to receive the cutting inserts 100. In accordance with an embodiment of the present invention, any suitable size or shape of insert pocket 18 may be used to engage any shape or size of tangential cutting insert 100.

In accordance with an embodiment of the present invention, each insert pocket 18 includes a radially recessed front portion 40 configured to accommodate the cutting portion 104 of the cutting insert 100. The radially recessed front portion 40 receives the cutting portion 104 that extends upward and downward from the substantially planar top and bottom base surfaces 116 and 118 of base portion 102. In accordance with an embodiment of the present invention, the depth and shape of the radially recessed front portion 40 may be varied depending on the size and shape of the top and bottom cutting clearance surfaces 134 and 136 of the cutting portion 104 of the cutting insert 100. This allows for the cutting portion 104 to have a thickness that is greater than or equal to the base portion 102 while allowing for each cutting insert 100 to be more rigidly mounted in its pocket 18. The top and bottom cutting clearance surfaces 134 and 136 of the cutting portion 104 being 180-degree rotationally symmetric about the central axis 105 allows for the cutting insert 100 to be indexable in the radially recessed front portion 40 of the same square pocket 18.

In accordance with an embodiment of the present invention, the first sidewall portion 22 may be sized to accommodate and the sidewall portion 24 may be sized to engage the base portion 102 of the cutting insert 100 and to allow the first and second side fan surfaces 130 and 132 of the cutting portion 104 to extend outward from the base portion 102. As shown in FIGS. 9 and 10, the insert spacing dividers 19 form the first sidewall portion 22 of a first insert pocket 18 and the second sidewall portion 24 of an adjacent insert pocket 18 in the flute 16. In accordance with an embodiment of the present invention, the first and second sidewall portions 22 and 24 terminate at an outward taper to accommodate the first and second side fan surfaces 130 and 132 of the cutting insert 100. In certain embodiments, first sidewall portion 22 may comprise a first taper 30 to accommodate the first side fan surface 130 of the cutting portion 104 of the cutting insert in the first insert pocket 18, and the second sidewall portion 24 may comprise a second taper 32 to accommodate the second side fan surface 132 of the cutting portion 104 of the cutting insert in the next insert pocket 18 in the flute 16. In accordance with an embodiment of the present invention, each insert spacing divider 19 comprises a first taper 30 and a second taper 32. In the embodiment shown, the first insert pocket 18 and the last insert pocket 18 of each flute 16 include at least one sidewall portion and respective taper that is formed by an end wall of the flute 16.

In certain embodiments, the first taper 30 has a first pocket taper angle that may be equal to or larger than the first outward taper angle $A_{T1}$, and the second taper 32 has a second pocket taper angle that may be equal to or larger than the second outward taper angle $A_{T2}$. The first and second pocket taper angles are selected to allow the cutting insert 100 to fit in the insert pocket 18, and for the first and second tapers 30 and 32 to engage or accommodate the first and second side fan surfaces 130 and 132.

Figure 11:
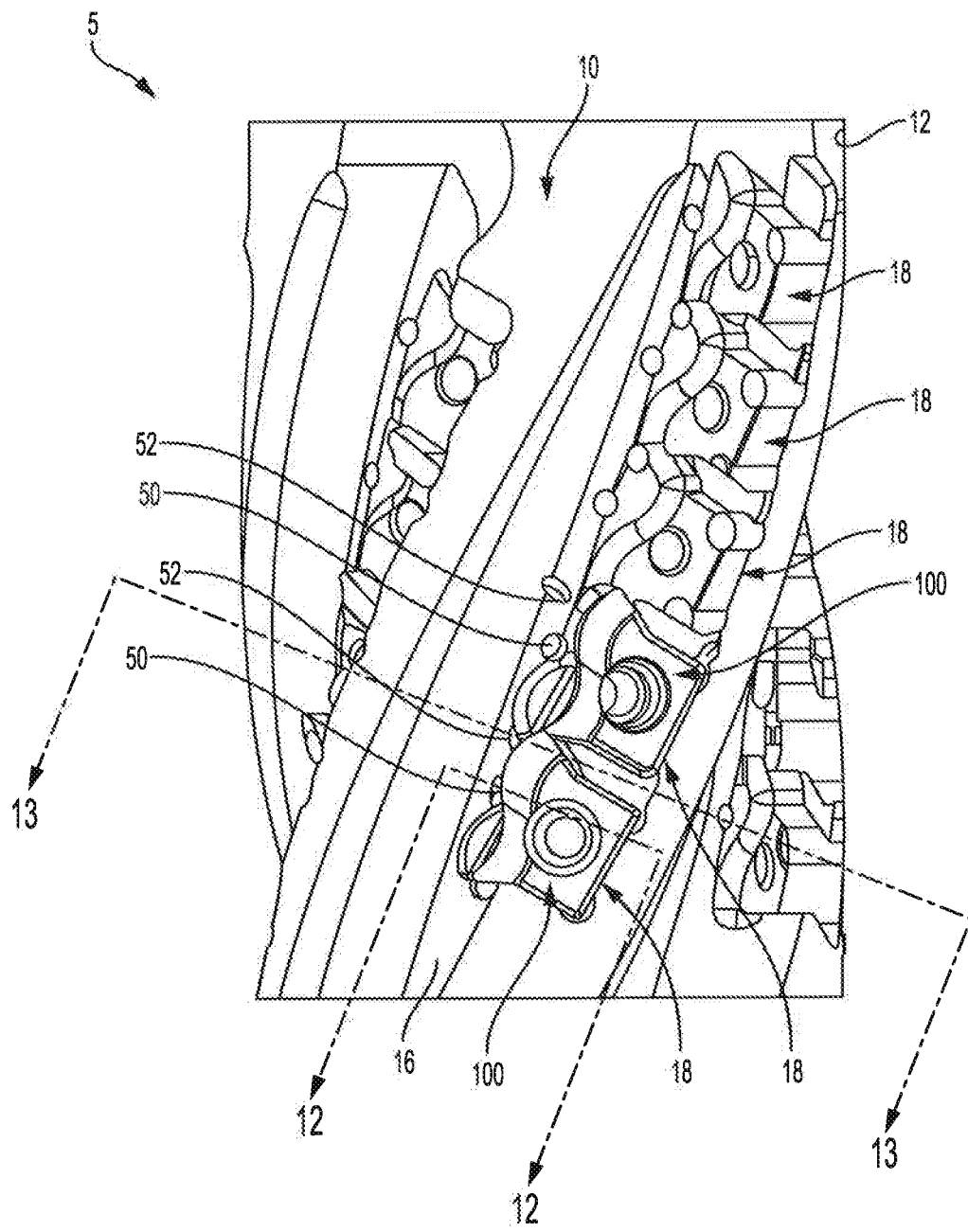
FIG. 11 is a front view of a cutting tool system in accordance with an embodiment of the present invention.
Figure 13:
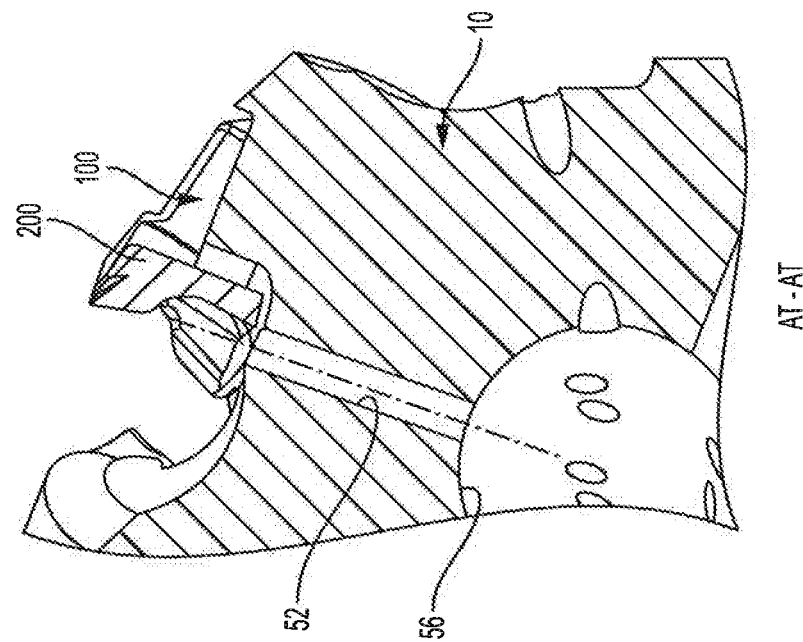
FIG. 13 is a cross-sectional view of the cutting tool system taken through line AT-AT of FIG. 11.
Figure 12:
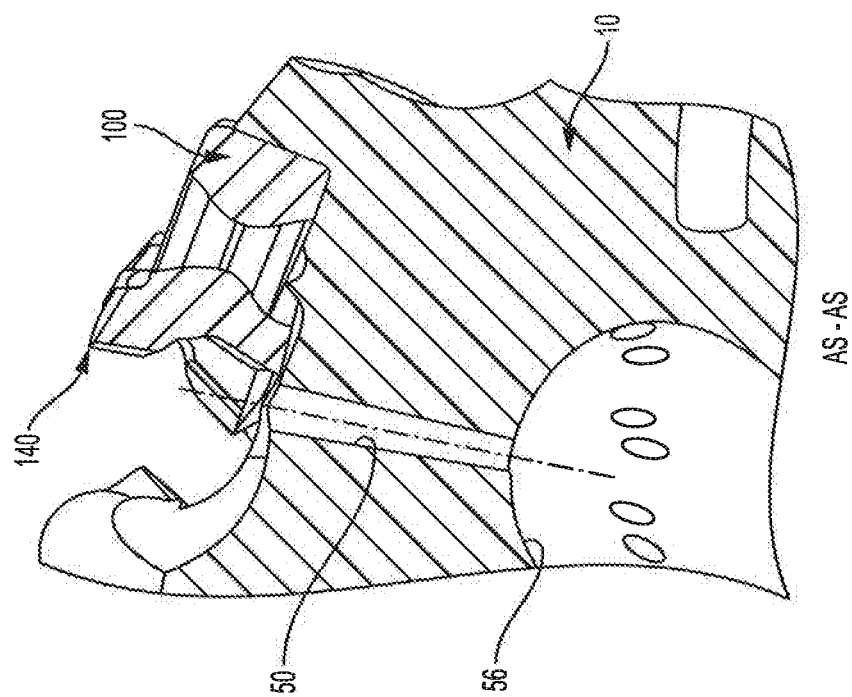
FIG. 12 is a cross-sectional view of the cutting tool system taken through line AS-AS of FIG. 11.

As shown in FIGS. 8-11, the each insert pocket 18 includes first and second coolant outlet apertures 50 and 52 in fluid communication with a coolant passage 56. In certain embodiments, the first and second coolant outlet apertures 50 and 52 have axial flow directions that are substantially parallel with the central axis of the adjacent mounting hole 28. The opening of the first coolant outlet aperture 50 and/or the opening of the second coolant outlet aperture 52 may be located at or near the radially recessed front portion 40. Each of the first and second coolant outlet apertures may be directed generally toward the cutting portion 104 of a cutting insert 100 mounted in an adjacent insert pocket 18. As shown in FIGS. 11 and 12, the first coolant outlet aperture 50 is configured to supply coolant to the cutting edge 140 of the cutting insert 100 in the insert pocket 18 to diminish excessive heat at the cutting edge-chip interface. As shown in FIGS. 11 and 13, the second coolant outlet aperture is 52 is configured to supply coolant to an intersection 200 of adjacent cutting inserts 100. This allows debris to be removed from between the cutting inserts. In the embodiment shown, each insert pocket 18 comprises two coolant outlet apertures, however any suitable number of coolant outlet apertures may be used, e.g., one, three, four or more coolant outlet apertures.

During cutting operations, the first and second coolant outlet apertures 50 and 52 may both be used to direct cooling fluid toward the cutting portion 104 under similar pressures and flow rates. Alternatively, the pressure and flow rates may be varied, for example, a constant flow rate may be directed through the first coolant outlet aperture 50 toward the cutting edge 140, while a pulsed flow may be provided through the second coolant outlet aperture 52 toward the intersection 200. In accordance with an embodiment of the present invention, the coolant pressure and flow rates may be modified by varying the size of the first and second coolant outlet apertures 50 and 52 and/or by including a nozzle.

Figure 14:
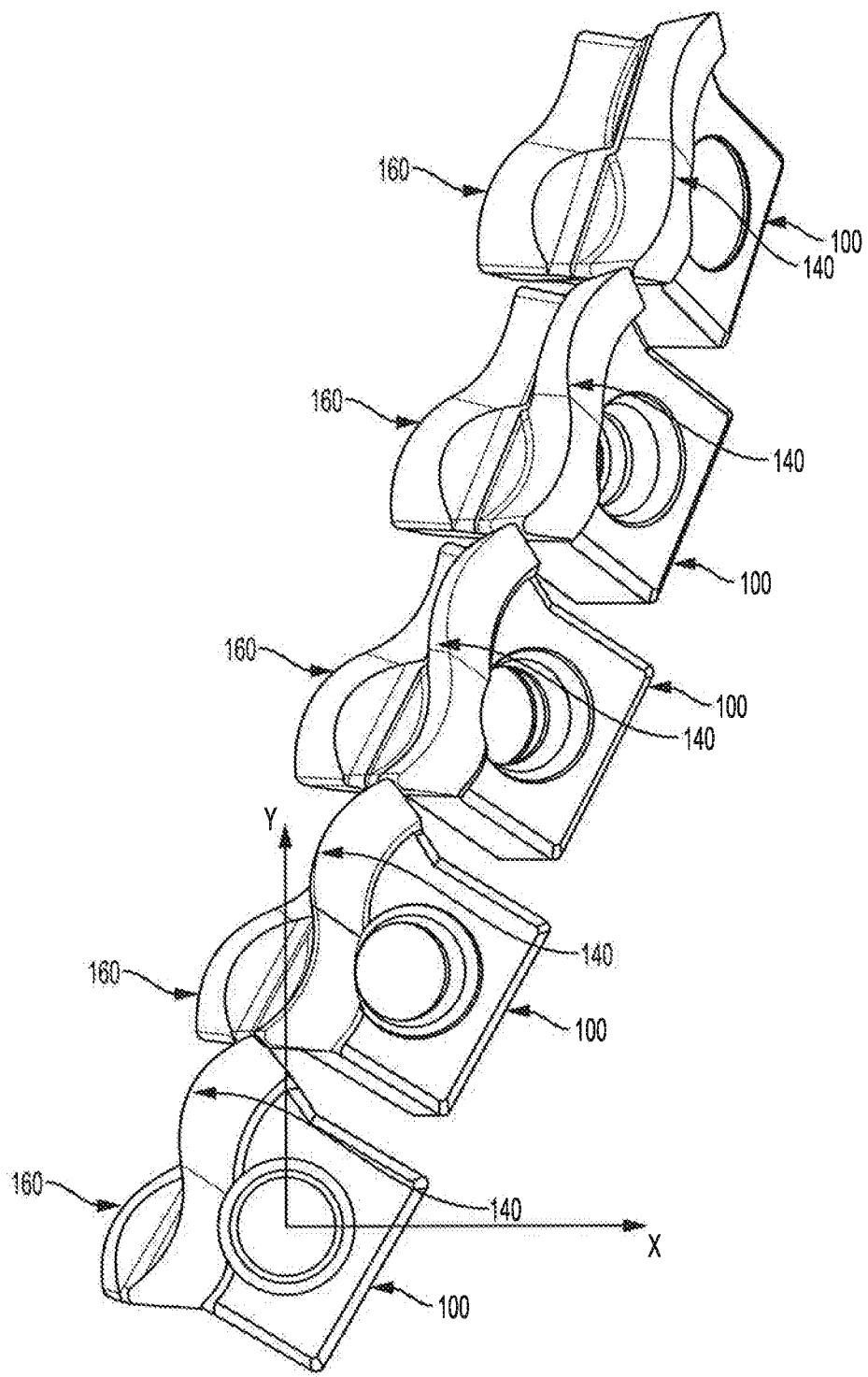
FIG. 14 is a front view of a series of tangential cutting inserts in accordance with an embodiment of the present invention.
Figure 15:
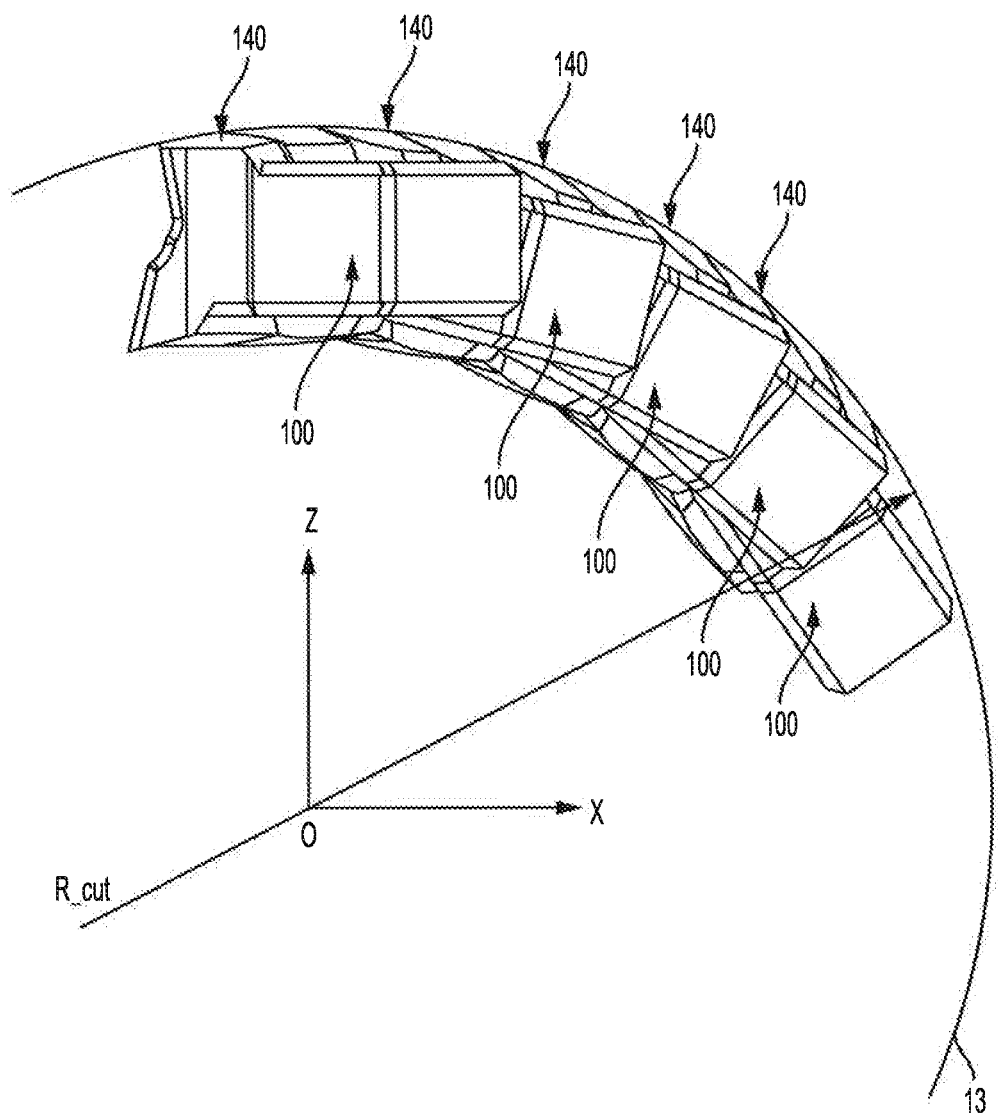
FIG. 15 is an isometric view of the series of tangential cutting inserts of FIG. 14.

FIGS. 14 and 15 illustrate the relative positioning of a series of indexable tangential cutting inserts 100 in accordance with an embodiment of the present invention. In the embodiment shown, five tangential cutting inserts 100 are positioned as if they were assembled and secured to the tool holder (not shown). The first cutting edges 140 from each corresponding cutting insert 100 are helically aligned to form a continuous cutting edge having a sinusoidal and helical combined geometry. The second cutting edges 160 from each corresponding cutting insert 100 may be individually indexed to provide a new cutting edge during machining operations. As shown in FIG. 15, the cylindrical outer surface 13 is defined by the cutting radius R_cut centered at the origin O of the XYZ coordinate system. FIG. 15 illustrates that in accordance with an embodiment of the present invention, the first sinusoidal and helical cutting edges 140 from each corresponding cutting insert 100 are located on the cylindrical outer surface 13.

The tool holder 10 may be made of any suitable material, such as steel, aluminum, titanium or any other material having sufficient strength. The tool holder 10 of the present invention may be fabricated by any suitable technique, such as machining to provide the insert pockets and flutes.

The cutting inserts 100 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The cutting inserts 100 of the present invention may be fabricated by any suitable technique, such as carbide powder pressing, grinding or additive manufacturing to provide the base portion and the cutting portion.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A tangential cutting insert comprising:
    a base portion comprising:
        a substantially planar rear face;
        a first substantially planar side base surface extending forward from the substantially planar rear face; and
        a second substantially planar side base surface extending forward from the substantially planar rear face;
        a substantially planar top base surface perpendicular to the first and second substantially planar side base surfaces and the substantially planar rear face;
        a substantially planar bottom base surface perpendicular to the first and second substantially planar side base surfaces and the substantially planar rear face; and
        a mounting through hole extending from the substantially planar top base surface to the substantially planar bottom base surface,
        wherein the substantially planar top base surface and the substantially planar bottom base surface are 180-degree rotationally symmetric about a central axis extending perpendicularly from the substantially planar rear base surface to a front surface; and
    a cutting portion comprising:
        a first side fan surface extending forward from the first substantially planar side base surface at a first outward taper angle and terminating at the front surface; and
        a second side fan surface extending forward from the second substantially planar side base surface at a second outward taper angle and terminating at the front surface.

2. The tangential cutting insert of claim 1, wherein the first outward taper angle is equal to the second outward taper angle.

3. The tangential cutting insert of claim 1, wherein the first and second outward taper angles are at least 1 degree.

4. The tangential cutting insert of claim 1, wherein the first and second outward taper angles range from 2.5 to 45 degrees.

5. The tangential cutting insert of claim 1, wherein the first and second substantially planar side base surfaces are perpendicular to the substantially planar rear face.

6. The tangential cutting insert of claim 1, wherein the cutting portion has a cutting portion width greater than a base width of the base portion.

7. The tangential cutting insert of claim 1, wherein the cutting portion comprises a top cutting clearance surface extending forward and upward from the substantially planar top base surface, and a bottom cutting clearance surface extending forward and downward from the substantially planar bottom base surface.

8. The tangential cutting insert of claim 1, wherein the front surface of the cutting portion comprises a first sinusoidal and helical cutting edge at a first edge of the cutting portion and a second sinusoidal and helical cutting edge at a second edge of the cutting portion.

9. The tangential cutting insert of claim 8, wherein the first and second sinusoidal and helical cutting edges are 180-degree rotationally symmetric about the central axis extending perpendicularly from the substantially planar rear base surface to the front surface.

10. A tangential cutting insert comprising:
    a substantially planar rear base surface;
    a front cutting surface opposing the substantially planar rear base surface;
    a central axis extending perpendicularly from the substantially planar rear base surface to the front cutting surface; and
    a first sinusoidal and helical cutting edge at a first edge of the front cutting surface and a second sinusoidal and helical cutting edge at a second edge of the front cutting surface, wherein the first and second sinusoidal and helical cutting edges are 180-degree rotationally symmetric about the center axis of the tangential cutting insert.

11. The tangential cutting insert of claim 10, wherein the first and second sinusoidal and helical cutting edges comprise a shape comprising one sinusoidal wavelength.

12. The tangential cutting insert of claim 10, wherein the tangential cutting insert comprises a first substantially planar side base surface extending perpendicularly forward from the substantially planar rear face and a second substantially planar side base surface extending perpendicularly forward from the substantially planar rear face.

13. The tangential cutting insert of claim 12, further comprising a first side fan surface extending forward from the first substantially planar side base surface at a first outward taper angle and terminating at the front cutting surface, and a second fan surface extending forward from the first substantially planar side base surface at a second outward taper angle and terminating at the front cutting surface.

14. A cutting tool system comprising:
    a plurality of cutting inserts, each cutting insert comprising:
        a substantially planar rear face having a base width;
        a first substantially planar side base surface extending forward from the substantially planar rear face;
        a second substantially planar side base surface extending forward from the substantially planar rear face; and
        a front cutting surface having a cutting surface width greater than the base width; and
    a tool holder comprising a plurality of insert pockets positioned in a helical orientation about a longitudinal axis of the tool holder, each insert pocket comprising:
        a rear surface to engage the substantially planar rear face of the cutting insert;

a first sidewall portion extending forward from the rear surface to accommodate the first substantially planar side surface of the cutting insert;

a second sidewall portion extending forward from the rear surface to engage the second substantially planar side surface of the cutting insert;

a bottom seating surface extending perpendicularly from the first and second sidewall portions and the rear surface; and a radially recessed front portion, wherein the first and second sidewall portions of each insert pocket terminate at an outward taper to accommodate a cutting portion of the cutting insert.

15. The cutting tool system of claim 14, wherein each cutting insert comprises a first side fan surface extending forward from the first substantially planar side base surface at a first outward taper angle and terminating at the front cutting surface, and a second fan surface extending forward from the first substantially planar side base surface at a second outward taper angle and terminating at the front cutting surface.

16. The cutting tool system of claim 14, wherein each cutting insert comprises a top base surface perpendicular to the first and second substantially planar side base surfaces and the substantially planar rear face, and a bottom base surface perpendicular to the first and second substantially planar side base surfaces and the substantially planar rear face.

17. The cutting tool system of claim 16, wherein the bottom seating surface of each insert pocket is structured and arranged to engage the top or bottom surface of the cutting insert.

18. The cutting tool system of claim 14, wherein the taper of the first and second sidewall portions have first and second angles that are larger than or equal to the first and second outward taper angles of the first and second side fan surfaces of the cutting insert.

19. A cutting tool holder comprising:

a plurality of insert pockets positioned in a helical orientation about a longitudinal axis of the tool holder, each insert pocket comprising:

a substantially planar rear surface;

a first substantially planar sidewall portion extending perpendicularly from the substantially planar rear surface;

a second substantially planar sidewall portion extending perpendicularly from the substantially planar rear surface;

a substantially planar bottom seating surface extending perpendicularly from the first and second substantially planar sidewall portions and the substantially planar rear surface; and a radially recessed front portion, wherein the radially recessed front portion is structured and arranged to receive a cutting portion of a cutting insert.

20. The cutting tool holder of claim 19, wherein the first and second sidewall portions of each insert pocket terminate at an outward taper to accommodate a cutting portion of a cutting insert.

21. The cutting tool holder of claim 19, wherein the radially recessed front portion comprises a first coolant outlet aperture and a second coolant outlet aperture.

22. The cutting tool holder of claim 19, wherein each insert pocket further comprises a first recessed channel between the substantially planar rear surface and the first substantially planar sidewall portion, and a second recessed channel between the substantially planar rear surface and the second substantially planar sidewall portion.

23. A cutting tool holder comprising:

a plurality of insert pockets positioned in a helical orientation about a longitudinal axis of the tool holder, each insert pocket comprising:

a first coolant outlet aperture structured and arranged to provide coolant to a cutting edge of a first cutting insert; and a second coolant outlet aperture structured and arranged to provide coolant to an intersection of the cutting edge of the first cutting insert and a cutting edge of a second cutting insert.

24. The cutting tool holder of claim 23, wherein the first and second coolant outlet apertures have axial flow directions that are substantially parallel with a central axis of a mounting hole of each insert pocket.

25. The cutting tool holder of claim 23, wherein the first and second coolant outlet apertures are located at a radially recessed front portion of each insert pocket.

26. The cutting tool holder of claim 23, wherein the first and second coolant outlet apertures provide a coolant fluid to the cutting inserts at similar flow rates.

27. The cutting tool holder of claim 23, wherein the first coolant outlet apertures provide a coolant fluid to the first cutting insert at first flow rate, and the second coolant outlet aperture provides a coolant fluid to the intersection at a second flow rate.

* * * * *